US006831685B1

(12) United States Patent
Ueno et al.

(10) Patent No.: US 6,831,685 B1
(45) Date of Patent: Dec. 14, 2004

(54) SOLID-STATE IMAGE PICKUP ELEMENT

(75) Inventors: Isamu Ueno, Hadano (JP); Shigetoshi Sugawa, Atsugi (JP); Katsuhisa Ogawa, Machida (JP); Toru Koizumi, Yokohama (JP); Tetsunobu Kochi, Hiratsuka (JP); Katsuhito Sakurai, Machida (JP); Hiroki Hiyama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/316,947

(22) Filed: May 24, 1999

(30) Foreign Application Priority Data

May 27, 1998 (JP) .......................................... 10-145869

(51) Int. Cl.⁷ .............................. H04N 9/64; H04N 3/14
(52) U.S. Cl. ...................... 348/243; 348/241; 348/302; 348/308; 348/312; 348/317
(58) Field of Search ................................ 348/308, 312, 348/317, 241, 243, 302

(56) References Cited

U.S. PATENT DOCUMENTS

| | | | | |
|---|---|---|---|---|
| 3,824,337 A | * | 7/1974 | Sangster et al. ............ | 348/309 |
| 5,331,421 A | * | 7/1994 | Ohzu et al. .................. | 348/262 |
| 5,587,738 A | * | 12/1996 | Shinohara ................... | 348/302 |
| 5,693,932 A | * | 12/1997 | Ueno et al. ............... | 250/208.1 |
| 5,861,620 A | * | 1/1999 | Takahashi et al. ........ | 250/208.1 |
| 5,933,189 A | * | 8/1999 | Nomura ....................... | 348/302 |
| 6,021,210 A | * | 2/2000 | Camus et al. ............... | 382/117 |
| 6,147,338 A | * | 11/2000 | Takahashi ................ | 250/208.1 |
| 6,160,581 A | * | 12/2000 | Higashihara et al. ....... | 348/364 |
| 6,166,769 A | * | 12/2000 | Yonemoto et al. .......... | 348/308 |
| 6,239,839 B1 | * | 5/2001 | Matsunaga et al. ......... | 348/308 |
| 6,248,991 B1 | * | 6/2001 | Chen et al. .............. | 250/208.1 |
| 6,317,154 B2 | * | 11/2001 | Beiley ........................ | 348/308 |
| 6,346,696 B1 | * | 2/2002 | Kwon ..................... | 250/208.1 |
| 6,483,541 B1 | * | 11/2002 | Yonemoto et al. .......... | 348/302 |

\* cited by examiner

Primary Examiner—Andrew Christensen
Assistant Examiner—Brian Genco
(74) Attorney, Agent, or Firm—Fitzpatrick, Cella, Harper & Scinto

(57) ABSTRACT

This invention is to provide a solid-state image pickup element including a sensor unit including a plurality of lines of photoelectric conversion units for generating charges from received light by photoelectric conversion, a memory unit including a plurality of lines of storage units for storing signals from the plurality of lines of photoelectric conversion units, a transfer unit for transferring a signal from the sensor unit to the memory unit, a control unit for causing storage units of an arbitrary block in the memory unit to output an image signal from the photoelectric conversion units and causing the photoelectric conversion units corresponding to the storage units of the arbitrary block to output a noise signal, and a subtracting unit for calculating a difference between the image signal and the noise signal.

5 Claims, 12 Drawing Sheets

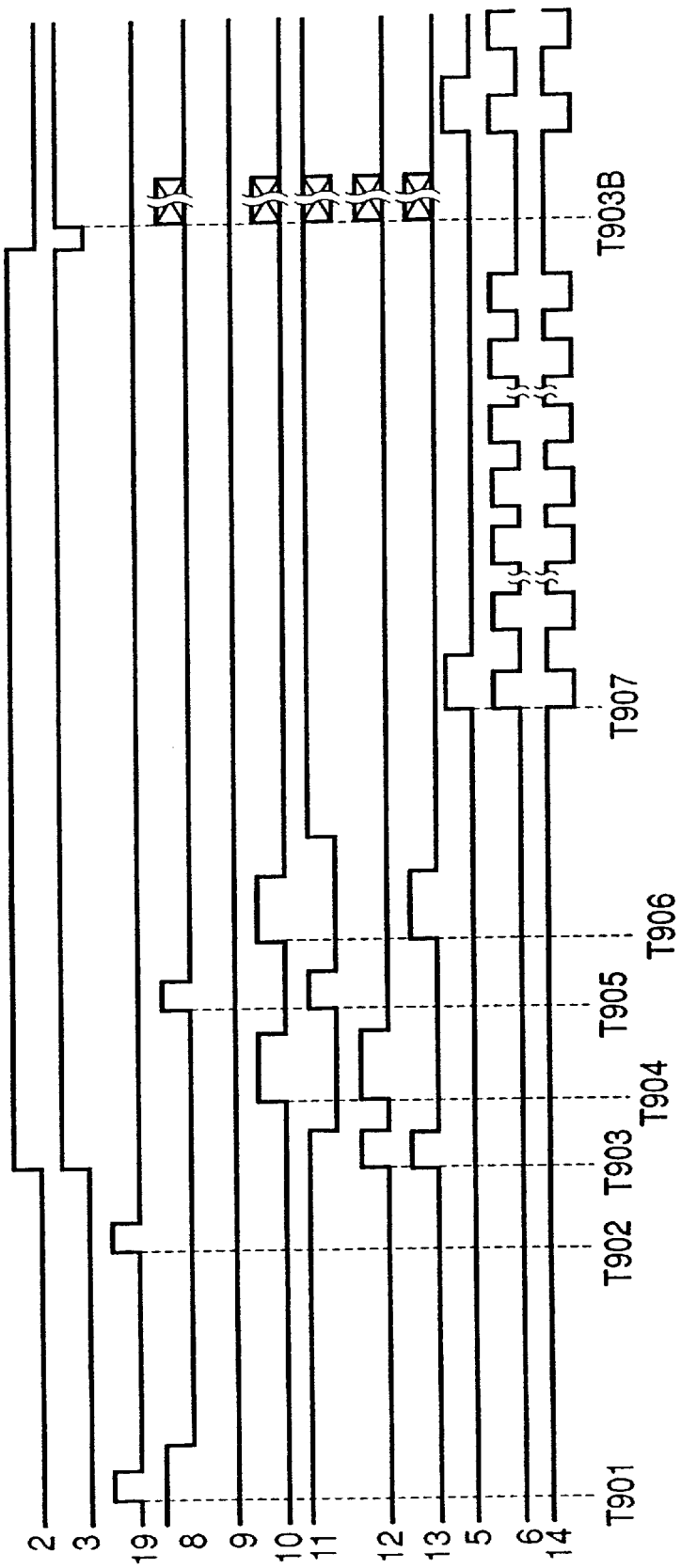

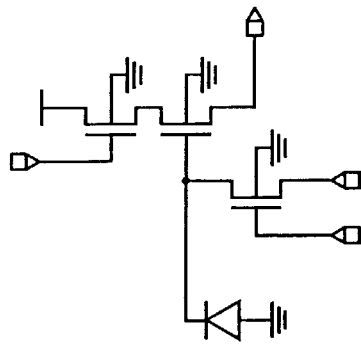
FIG. 11A
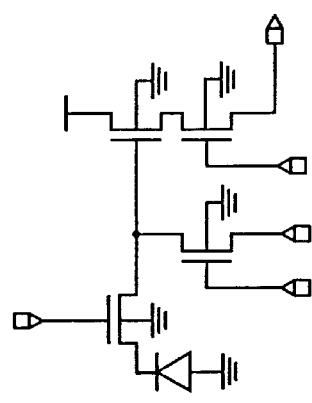
FIG. 11B
FIG. 11C
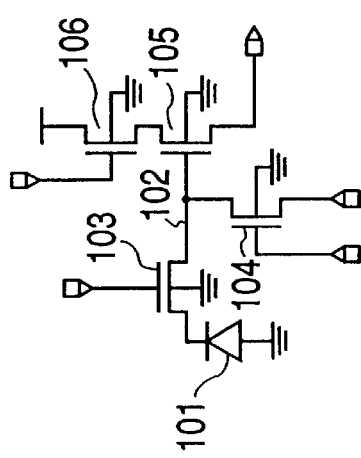
FIG. 11D
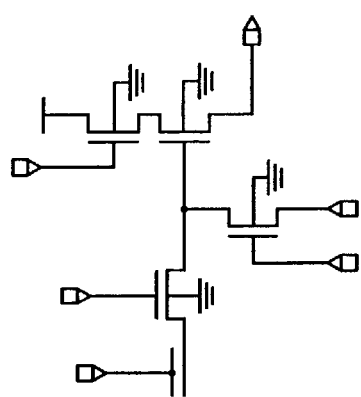
FIG. 11E
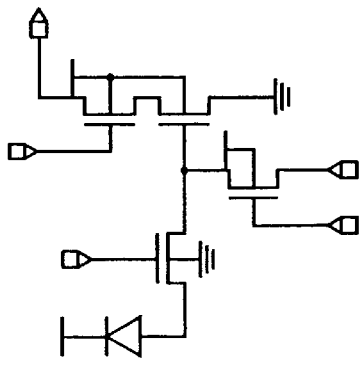

US 6,831,685 B1

SOLID-STATE IMAGE PICKUP ELEMENT

BACKGROUND OF THE INVENTION

1. Field of the Invention

The present invention relates to a solid-state image pickup element for outputting a signal of incident video light and an image pickup apparatus using the same.

2. Related Background Art

A solid-state image pickup element according to a first example of prior art will be described.

FIG. 1 is a circuit diagram of the solid-state image pickup element of the first example of prior art. Referring to FIG. 1, the solid-state image pickup element comprises a photodiode 101 as a photodetecting element for generating charges corresponding to incident light, a floating diffusion region 102, a transfer transistor 103 for transferring charges generated by the photodiode 101 to the floating diffusion region 102, a reset transistor 104 for removing charges stored in the floating diffusion region 102, amplification transistors 105, 106, and 107, a capacitor 108 for storing a voltage generated in the floating diffusion region upon resetting, a capacitor 109 for storing a voltage generated in the floating diffusion region in an operative state, a switching transistor 110 for connecting an amplifier to the capacitor 108, a switching transistor 111 for connecting an amplifier to the capacitor 109, a capacitor discharging transistor 112 for discharging the capacitors 108 and 109, buffers 113 and 114, switching transistors 115 and 116 for switching the capacitors 108 and 109 to capacitors of another line and supplying the voltages of the capacitors 108 and 109 to the buffers 113 and 114, respectively, reset transistors 117 and 118 for resetting input voltages to the buffers 113 and 114, respectively, horizontal output lines 119 and 120, a vertical scanning circuit 121, and a horizontal scanning circuit 122. The amplifier formed from the transistors 105, 106, and 107 serves as a source-follower-type amplifier only when the transistors 106 and 107 are ON. The photodiode 101, floating diffusion region 102, and transistors 103, 104, 105, and 106 form one pixel.

FIG. 2 is a timing chart showing the operation timing of the solid-state image pickup element shown in FIG. 1. The operation of the solid-state image pickup element shown in FIG. 1 will be described with reference to FIGS. 1 and 2.

At time T801, a vertical scanning start pulse is input to a terminal 2,: a vertical scanning pulse is input to a terminal 3 to select the first line, and a signal 20a goes high (not shown). A pulse of high level is input to a terminal 8 to reset the floating diffusion region 102. Terminals 11, 12, and 13 are simultaneously set at high level, and the capacitors 108 and 109 are reset. At time T802, the reset pulse at the terminal 8 goes low to set the floating diffusion region 102 in an electrically floating state. At time T803, a pulse of high level is applied to a terminal 10, and simultaneously, a pulse of high level is applied to the terminal 12, so the voltage (reset voltage) immediately after resetting the floating diffusion region 102 is read out to the capacitor 108. At time T804, a pulse of high level is applied to a terminal 9 to transfer charges generated by the photodiode 101 to the floating diffusion region 102. At time T805, pulses of high level are applied to the terminals 10 and 13 to read out the voltage (signal voltage+reset voltage) of the floating diffusion region 102 to the capacitor 109. At time T806, the voltage at a terminal 14 changes from high level to low level to reset the horizontal output lines 119 and 120. At the same time, a horizontal scanning start pulse is input to a terminal 5, and a horizontal scanning pulse is input to a terminal 6 to start the signal read from line memories formed from capacitors of the respective columns. The input signal to the terminal 14 is in an opposite phase to that of the horizontal scanning pulse to prevent interference between the capacitors of the respective columns. Reset voltages of the respective columns are sequentially output from a terminal 16. Sums of signal voltages and reset voltages of the respective columns are sequentially output from a terminal 17. When the difference between two outputs is calculated by a subtracting means connected to the output side, a signal voltage containing no reset voltage that varies between pixels can be obtained. Hence, an output with a high S/N ratio, which contains no noise component due to a variation in reset voltage, can be obtained.

The photodiode 101 is reset at time T804 when charges are transferred from the photodiode 101 to the floating diffusion region 102. Resetting is completed when the signal at the terminal 9 goes low to end transfer. After this, storage of charges corresponding to incident light is restarted. This storage operation continues until T804 of the next frame cycle.

From time T801B, the signals input to the terminals 3, 8, 9, 10, 11, 12, 13, 5, 6, and 14 repeat their patterns from time T801 to time T801B. Referring to FIG. 3, by operation of the vertical scanning circuit 121, the signal 20a goes high during only the first line period. Sequentially, a signal 20b goes high during only the second line period, and then, a signal 20c goes high during only the third line period. Because of the presence of a gate group 123, signals supplied to the terminals 8, 9, and 10 become valid for only the first line during the first line period, for only the second line during the second line period, and for only the third line during the third line period, and this also applies to the following lines.

Hence, signals output from the terminals 16 and 17 are signals stored in the photodiodes at timings that sequentially shift in units of lines. This scheme is called a rolling shutter scheme.

The floating diffusion region 102 holds the transferred charges after charge transfer from the photodiode 101 until resetting and therefore functions as a memory.

A second example of prior art will be described next.

FIG. 4 is a circuit diagram of a solid-state image pickup element of the second example of prior art. The same reference numerals as in the first example of prior art shown in FIG. 1 denote the same parts in FIG. 4, and a detailed description thereof will be omitted. A gate group 123 has the same arrangement as in the first example of prior art although it is represented by different symbols. In the second example of prior art, an OR gate 124 is inserted between the output terminal of the elements of the gate group 123 for receiving a signal from a terminal 9 and the gate of a transfer transistor 103.

FIG. 5 is a timing chart showing the operation timings of the solid-state image pickup element shown in FIG. 4. The operation of the solid-state image pickup element shown in FIG. 4 will be described with reference to FIGS. 4 and 5.

At time T901, pulses of high level are applied to terminals 8 and 19 to reset floating diffusion regions 102 of all pixels and reset photodiodes 101 of all pixels. When resetting is ended, storage of charges corresponding to incident light by the photodiodes 101 of all pixels is started. At time T902, a pulse of high level is applied to the terminal 19 again to transfer charges stored in the photodiodes 101 of all pixels to the floating diffusion regions 102. After this pulse of high level goes low, the charges transferred to the floating diffusion regions 102 are held. At time T903, a vertical scanning start pulse is input to a terminal 2, and a vertical scanning pulse is input to a terminal 3 to select the first line, and a signal 20a goes high (not shown). At time T903, pulses of high level are applied to terminals 11, 12, and 13 to reset capacitors 108 and 109. At time T904, pulses of high level are applied to terminals 10 and 12 to read out (signal voltage+reset voltage) from the photodiode of the floating diffusion region 102 to a capacitor 110. At time T905, a pulse of high level is applied to the terminal 8 to reset the floating diffusion region 102. At time T906, pulses of high level are applied to the terminals 10 and 13 to read out the reset voltage of the floating diffusion region 102 to the capacitor 109. At time T906, the voltage at a terminal 14 changes from high level to low level to reset horizontal output lines 119 and 120. At time same time, a horizontal scanning start pulse is input to a terminal 5, and a horizontal scanning pulse is input to a terminal 6 to start the signal read from line memories formed from capacitors of the respective columns. The input signal to the terminal 14 is in an opposite phase to that of the horizontal scanning pulse to prevent interference between the capacitors of the respective columns. Reset voltages of the respective columns are sequentially output from a terminal 16. Sums of signal voltages and reset voltages of the respective columns are sequentially output from a terminal 17. When the difference between two outputs is calculated by a subtracting means connected to the output side, a signal voltage containing no reset voltage that varies between pixels can be obtained. Hence, an output with a high S/N ratio, which contains no noise component due to a variation in reset voltage, can be obtained.

As in the first example of prior art, the operation for the first line in the period from time T903 to time T903B is sequentially performed for lines from the second lines even after time T903B, and signals of the respective lines are sequentially output from the terminals 16 and 17.

The scheme of the second example of prior art is called a high-speed shutter scheme.

In the first example of prior art, when an object moves at a high speed, the contents at the upper portion of an image shift from those at the lower portion of the screen, resulting in a distortion in image. If an object is to be photographed by irradiating the object with electronic flash light, the brightness of the object changes between the upper portion of the screen and the lower portion of the screen.

The second example of prior art solves the two problems of the first example of prior art by using charges stored in the photodiodes 101 from time 901 to time 902 as signals of all pixels. However, the second example of prior art has the following problem.

FIG. 6 is a sectional view of each pixel. Referring to FIG. 6, the pixel is formed from the photodiode 101 shown in FIG. 4, floating diffusion region 102 shown in FIG. 4, transfer transistor 103 shown in FIG. 4, a well 130, and a shielding plate 131. Light hv is incident on the pixel. The light incident on the pixel contains obliquely incoming components that reach portions near the floating diffusion region 102 of the photodiode 101 or floating diffusion region 102. Some of charges generated by the light incident on portions near the floating diffusion region 102 of the photodiode 101 make a detour through the transfer transistor 103 and moves to the floating diffusion region 102. Charges are also generated by light incident on the floating diffusion region 102. Even after the charges are transferred from the photodiode 101 to the floating diffusion region 102 at time 903, the number of charges in the floating diffusion region 102 increases as the time elapses. Hence, in the second example of prior art in which charges stored in the floating diffusion region 102 are read out in one frame period sequentially from pixels of the upper line to pixels of the lower line, a noise signal due to the above reason becomes large toward the lower line, and smearing occurs in the output image signal.

SUMMARY OF THE INVENTION

It is an object of the present invention to provide a solid-state image pickup element which can prevent any shift between contents at the upper portion of an image and those at the lower portion of the screen even when the object moves at a high speed.

It is another object of the present invention to provide a solid-state image pickup element which can prevent brightness at the upper portion of a screen from changing from that at the lower portion of the screen even in photographing using an electronic flash.

It is still another object of the present invention to provide a solid-state image pickup element which outputs a signal without any smearing due to a variation in charges in a floating diffusion region after transfer of charges from a photoelectric conversion means such as a photodiode.

It is still another object of the present invention to provide a solid-state image pickup element capable of obtaining the image signal of an object by only receiving electronic flash light.

It is still another object of the present invention to obtain an image signal almost free from noise.

In order to achieve the above objects, according to the first aspect of the present invention, there is provided a solid-state image pickup element comprising a plurality of pixel cells each including photoelectric conversion means for photoelectrically converting received light to generate charges, first transfer means for transferring the charges generated by the photoelectric conversion means, first storage means for storing the transferred charges, first output means for time-divisionally outputting a potential generated in the first storage means, and initialization means for initializing the voltage in the first storage means to a predetermined value, means for simultaneously operating the first transfer means of the plurality of pixel cells; means for simultaneously operating the initialization means of the plurality of pixel cells, a plurality of first output lines for receiving outputs from the pixel cells in units of columns, a plurality of second storage means arranged in a one-to-one correspondence with significant pixel cells of the plurality of pixel cells, a plurality of second transfer means for selectively transferring signals of the plurality of first output lines to the plurality of second storage means in units of columns, and control means for controlling the first transfer means, the output means, and the plurality of second transfer means.

According to another aspect of the present invention, there is provided a solid-state image pickup element comprising a sensor unit including a plurality of lines of photoelectric conversion means for generating charges from received light by photoelectric conversion, a memory unit including a plurality of lines of storage means for storing signals from the plurality of lines of photoelectric conversion means, transfer means for transferring a signal from the sensor unit to the memory unit, control means for causing storage means of an arbitrary block in the memory unit to output an image signal from the photoelectric conversion means and causing the photoelectric conversion means corresponding to the storage means of the arbitrary block to output a noise signal, and removal means for removing the noise signal from the image signal.

According to still another aspect of the present invention, there is provided a solid-state image pickup element comprising photoelectric conversion means for generating charges from received light, storage means for storing a signal from the photoelectric conversion means, read means for reading out a first signal output from the photoelectric conversion means and a second signal output from the same photoelectric conversion means through the same storage means, and subtracting means for calculating a difference between the first signal and the second signal, which are read out by the read means.

According to still another aspect of the present invention, there is provided an image pickup apparatus comprising a sensor unit including a plurality of lines of photoelectric conversion means for generating charges from received light by photoelectric conversion, a memory unit including a plurality of lines of storage means for storing signals from the plurality of lines of photoelectric conversion means, transfer means for transferring a signal from the sensor unit to the memory unit, control means for causing storage means of an arbitrary block in the memory unit to output an image signal from the photoelectric conversion means and causing the photoelectric conversion means corresponding to the storage means of the arbitrary block to output a noise signal, subtracting means for calculating a difference between the image signal and the noise signal, and adjustment means for performing at least one of exposure adjustment, focusing adjustment, and zoom adjustment on the basis of a signal output from the subtracting means.

According to still another aspect of the present invention, there is provided an image pickup apparatus comprising photoelectric conversion means for generating charges from received light, storage means for storing a signal from the photoelectric conversion means, read means for reading out a first signal output from the photoelectric conversion means and a second signal output from the same photoelectric conversion means through the same storage means, subtracting means for calculating a difference between the first signal and the second signal, which are read out by the read means, and adjustment means for performing at least one of exposure adjustment, focusing adjustment, and zoom adjustment on the basis of a signal output from the subtracting means.

Other objects, features, and advantages of the present invention will be apparent from the following detailed description in conjunction with the accompanying drawings.

BRIEF DESCRIPTION OF THE DRAWINGS

FIG. 5 is a timing chart showing the operation timings of the solid-state image pickup element according to prior art 2;

FIGS. 11A, 11B, 11C, 11D and 11E are equivalent circuit diagrams of a pixel of a solid-state image pickup element according to the third embodiment of the present invention;

DESCRIPTION OF THE PREFERRED EMBODIMENTS

Figure 1:
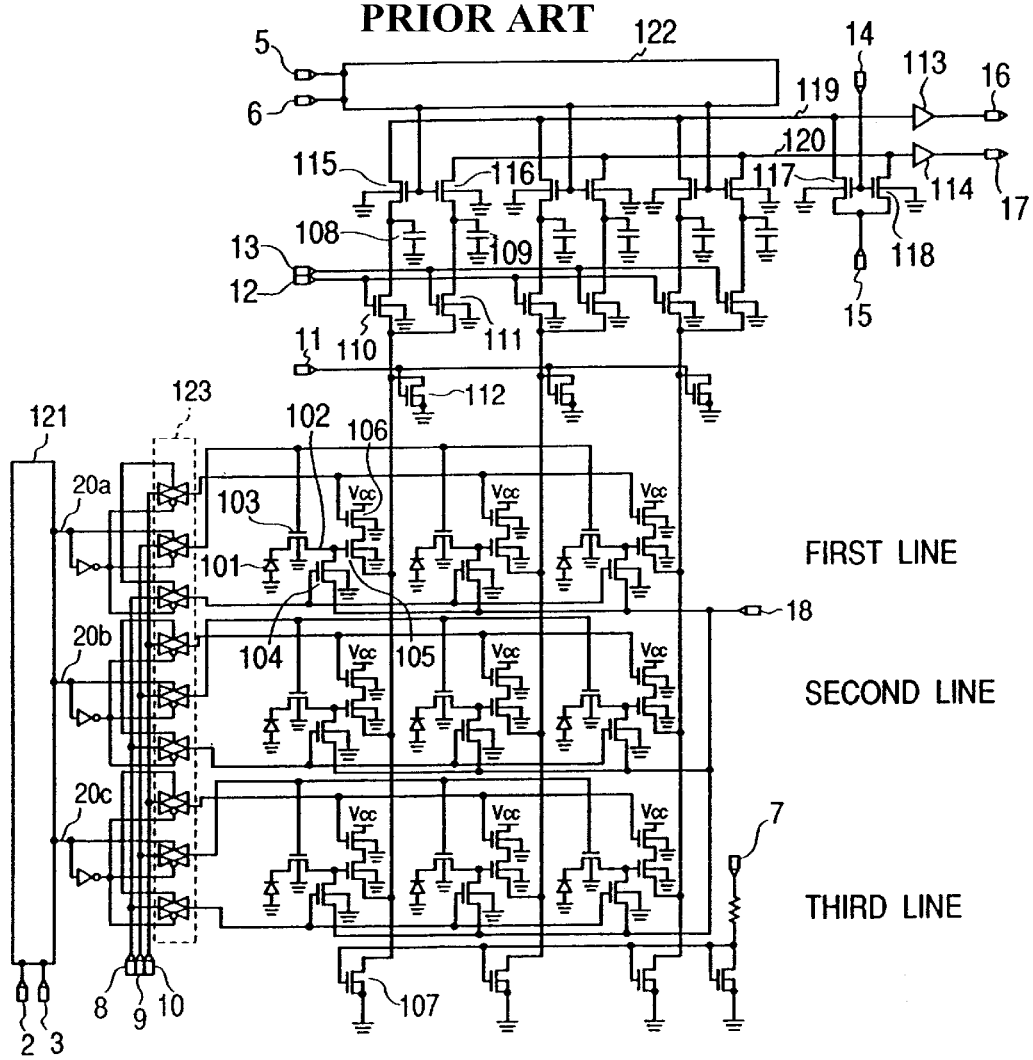
FIG. 1 is a block diagram showing the arrangement of a solid-state image pickup element according to prior art 1.
Figure 2:
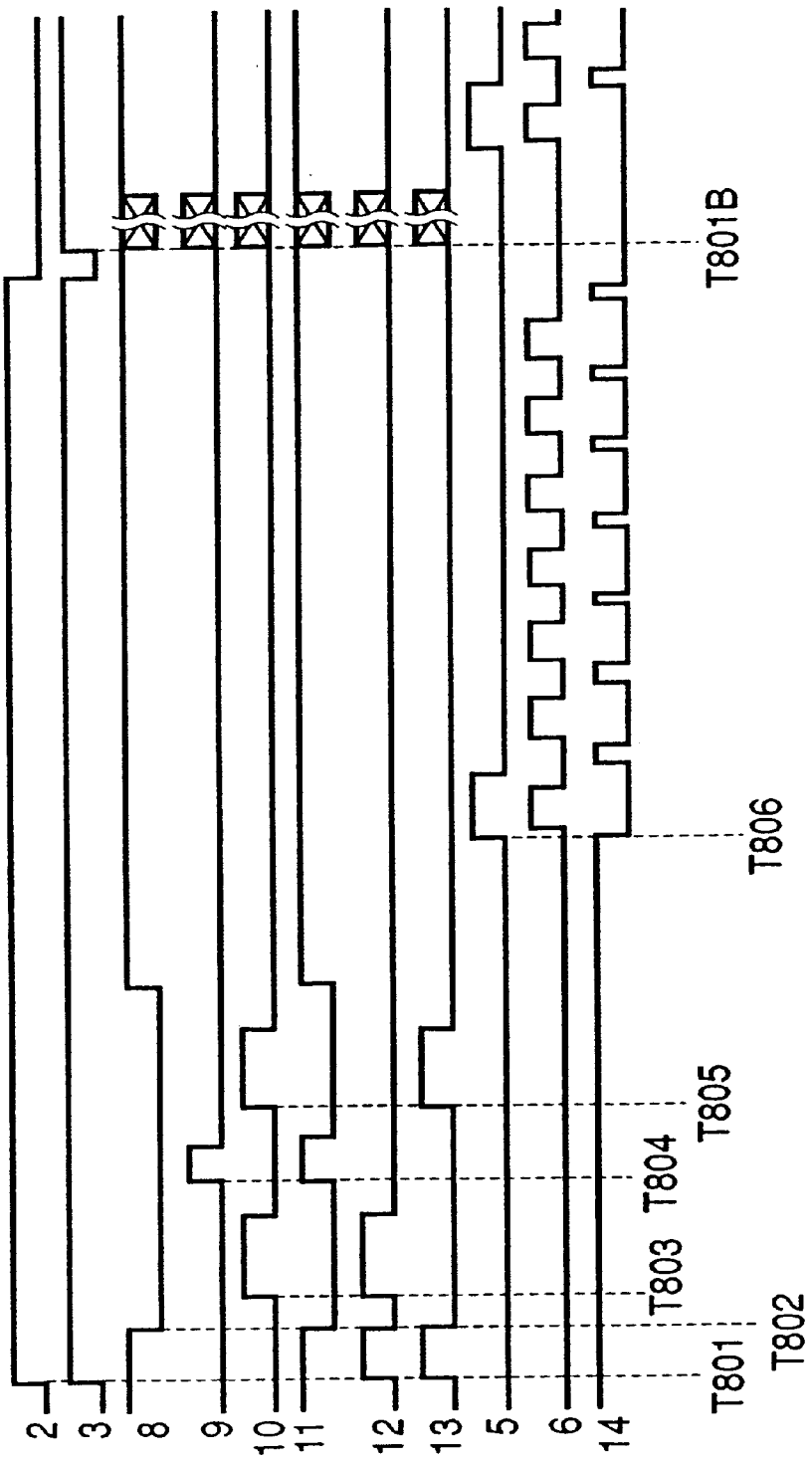
FIG. 2 is a first timing chart showing the operation timings of the solid-state image pickup element according to prior art 1.
Figure 3:
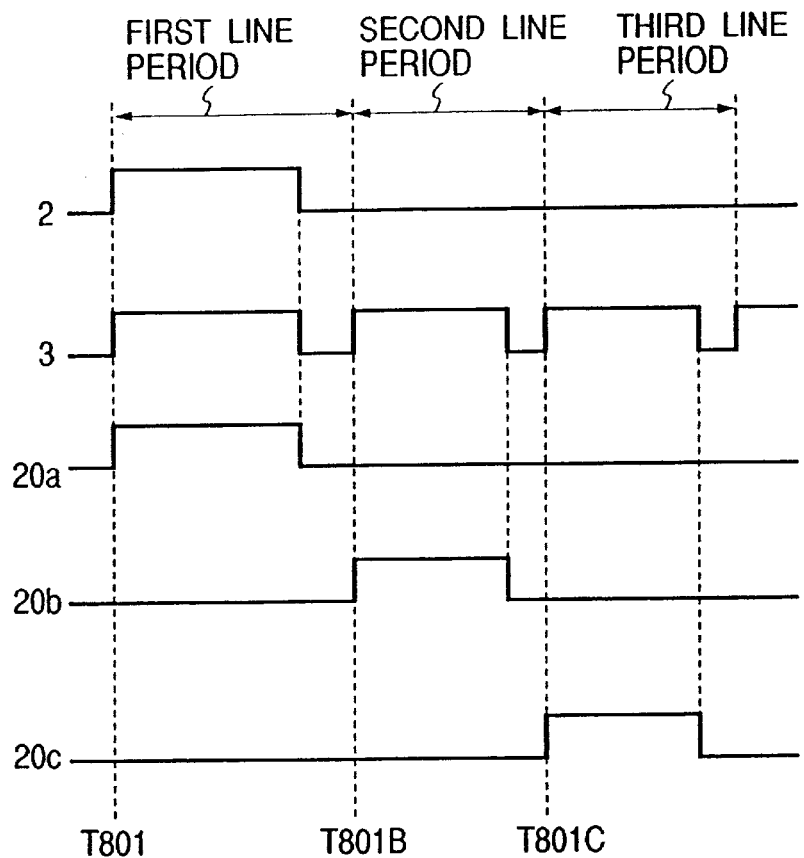
FIG. 3 is a second timing chart showing the operation timings of the solid-state image pickup element according to prior art 1.
Figure 6:
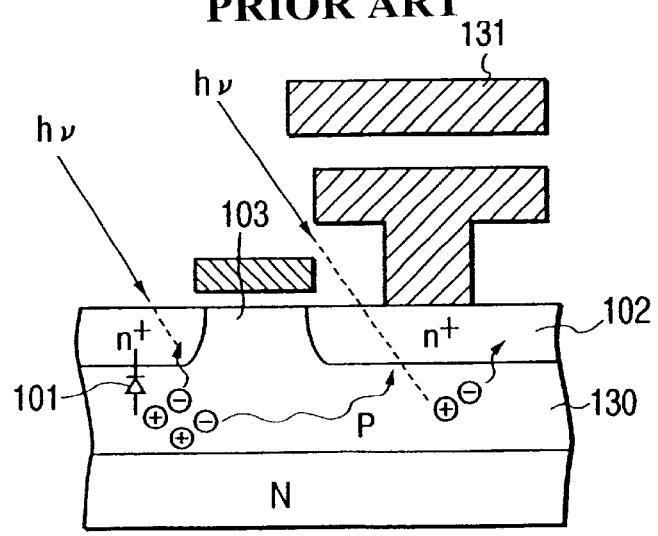
FIG. 6 is a sectional view of part of a pixel of the present invention and prior arts.
Figure 4:
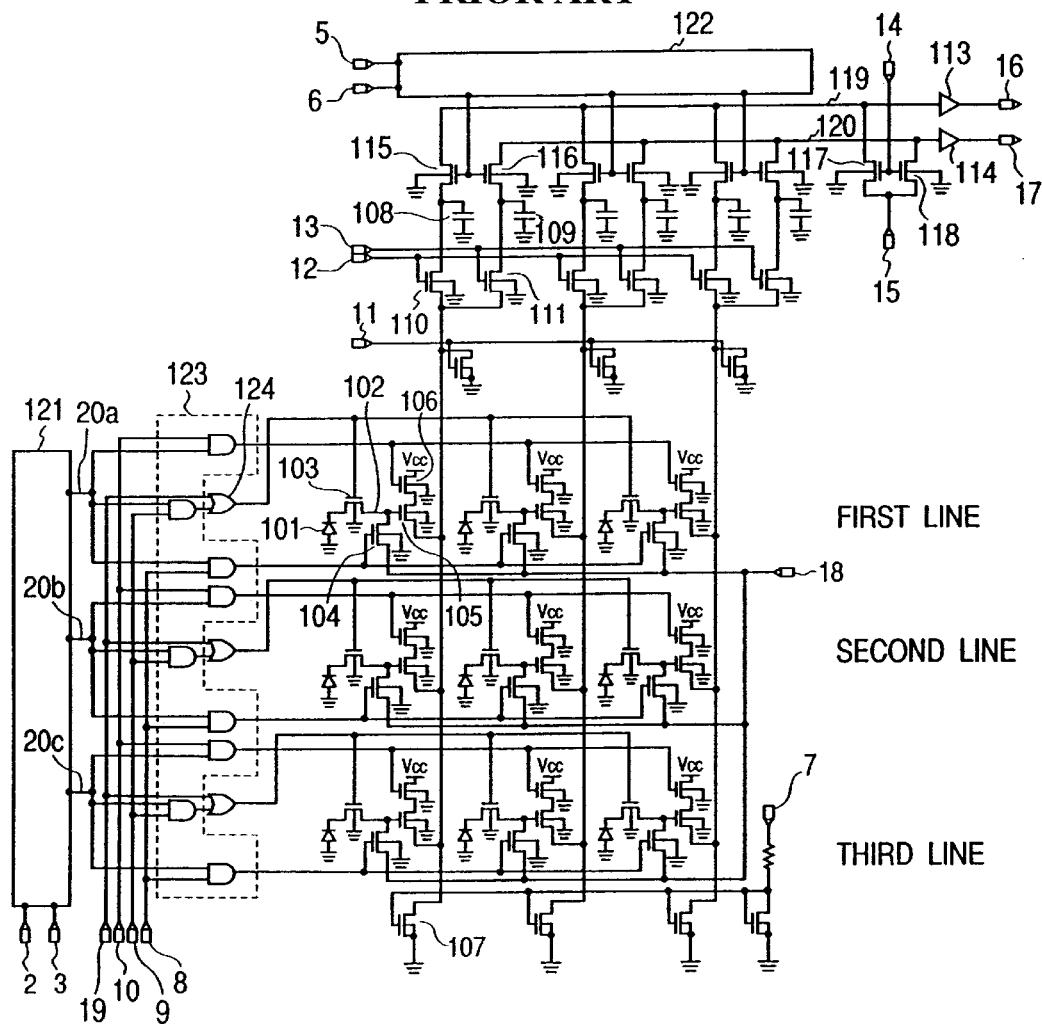
FIG. 4 is a block diagram showing the arrangement of a solid-state image pickup element according to prior art 2.
Figure 7:
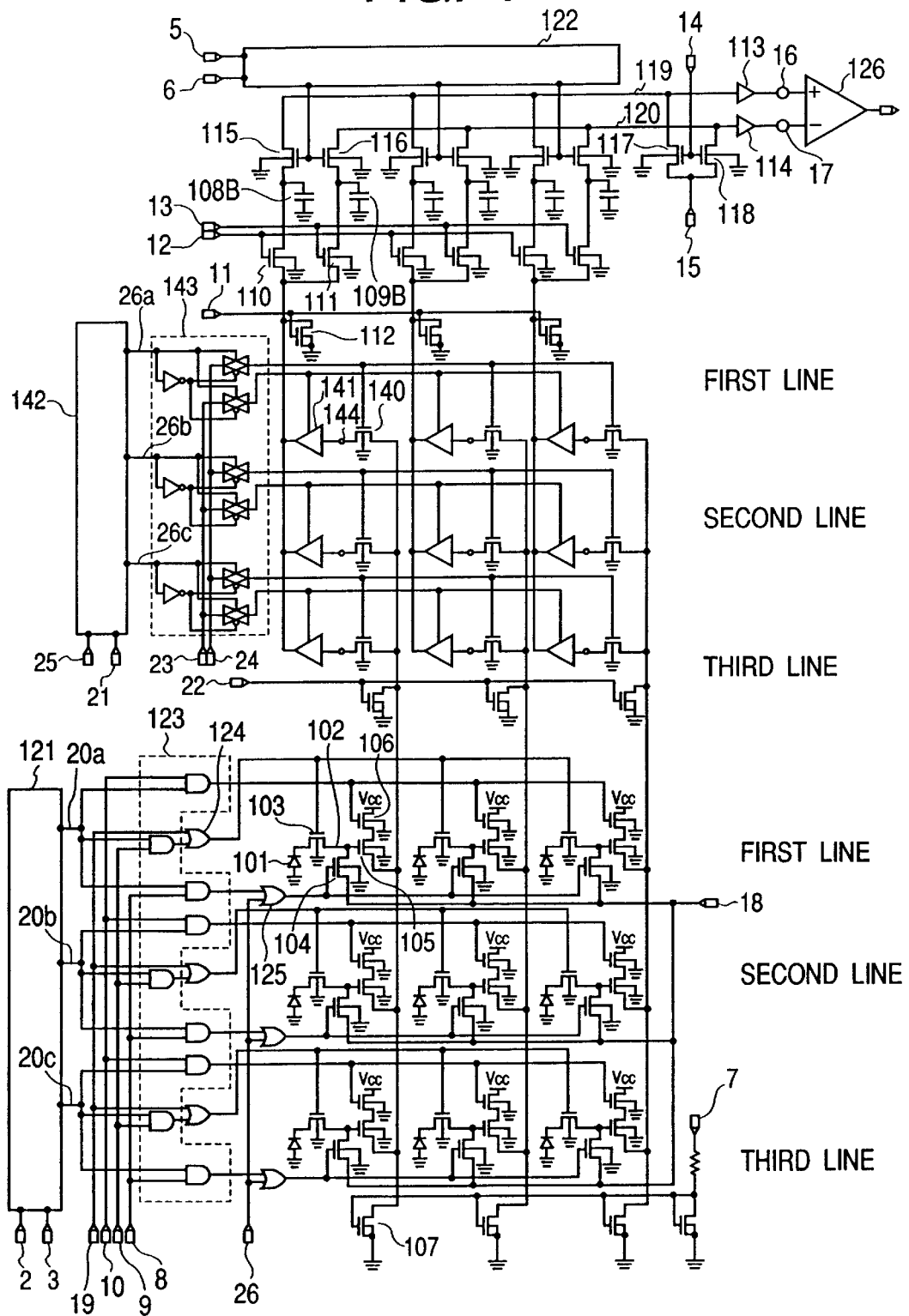
FIG. 7 is a block diagram showing the arrangement of a solid-state image pickup element according to the first embodiment of the present invention.

FIG. 7 is a circuit diagram of a solid-state image pickup element according to the first embodiment.

Referring to FIG. 7, the solid-state image pickup element comprises a photodiode 101 as a photodetecting element for generating charges corresponding to incident light, a floating diffusion region 102, a transfer transistor 103 for transferring charges generated by the photodiode 101 to the floating diffusion region 102, a reset transistor 104 for removing charges stored in the floating diffusion region 102, amplification transistors 105, 106, and 107, a first capacitor 108B for storing a voltage generated in the floating diffusion region, a second capacitor 109B for storing a voltage generated in the floating diffusion region, a switching transistor 110 for connecting an amplifier to the capacitor 108B, a switching transistor 111 for connecting an amplifier to the capacitor 109B, a capacitor discharging transistor 112 for discharging the capacitors 108B and 109B, buffers 113 and 114, switching transistors 115 and 116 for switching the capacitors 108B and 109B to capacitors of another line and supplying the voltages of the capacitors 108B and 109B to the buffers 113 and 114, respectively, reset transistors 117 and 118 for resetting input voltages to the buffers 113 and 114, respectively, horizontal output lines 119 and 120, a vertical scanning circuit 121, and a first horizontal scanning circuit 122. The amplifier formed from the transistors 105, 106, and 107 serves as a source-follower-type amplifier only when the transistors 106 and 107 are ON. The photodiode 101, floating diffusion region 102, and transistors 103, 104, 105, and 106 form one pixel.

In this embodiment, an OR gate 124 is inserted between the output terminal of the elements of a gate group 123 for receiving a signal from a terminal 9 and the gate of a transfer transistor 103, as in the second example of prior art.

In this embodiment, an OR gate 125 is inserted between the output terminal of the elements of the gate group 123 for receiving a signal from a terminal 8 and the gate of the reset transistor 104.

Additionally, in this embodiment, a transfer transistor 140, a buffer 141 with output enable control, a second vertical scanning circuit 142, and a second gate group 143 are added. A diffusion floating region 144 for storing signals from all pixels is formed between the transfer transistor 140 and buffer 141. The transfer transistor 140, buffer 141, and diffusion floating region 144 construct a memory.

Figure 9:
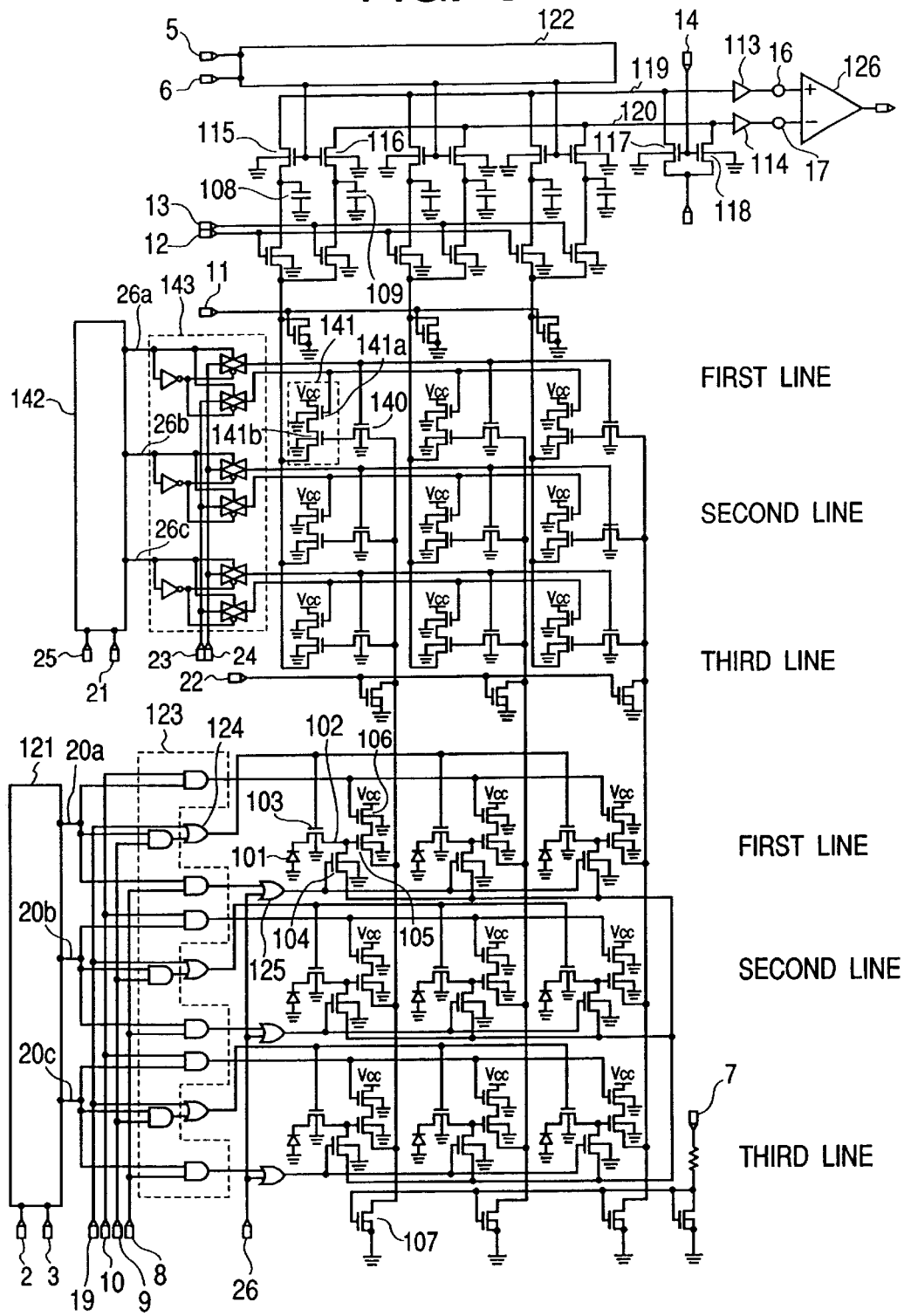
FIG. 9 is a timing chart showing the operation timings of the solid-state image pickup element according to the first embodiment of the present invention.

FIG. 9 is a block diagram showing the arrangement of the solid-state image pickup element according to the first embodiment. Unlike the block diagram of FIG. 7 that shows the arrangement of the solid-state image pickup element, FIG. 9 shows details of the arrangement of the buffer 141. Referring to FIG. 9, the buffer 141 is constructed by a transistor 141a and a transistor 141b.

Figure 8:
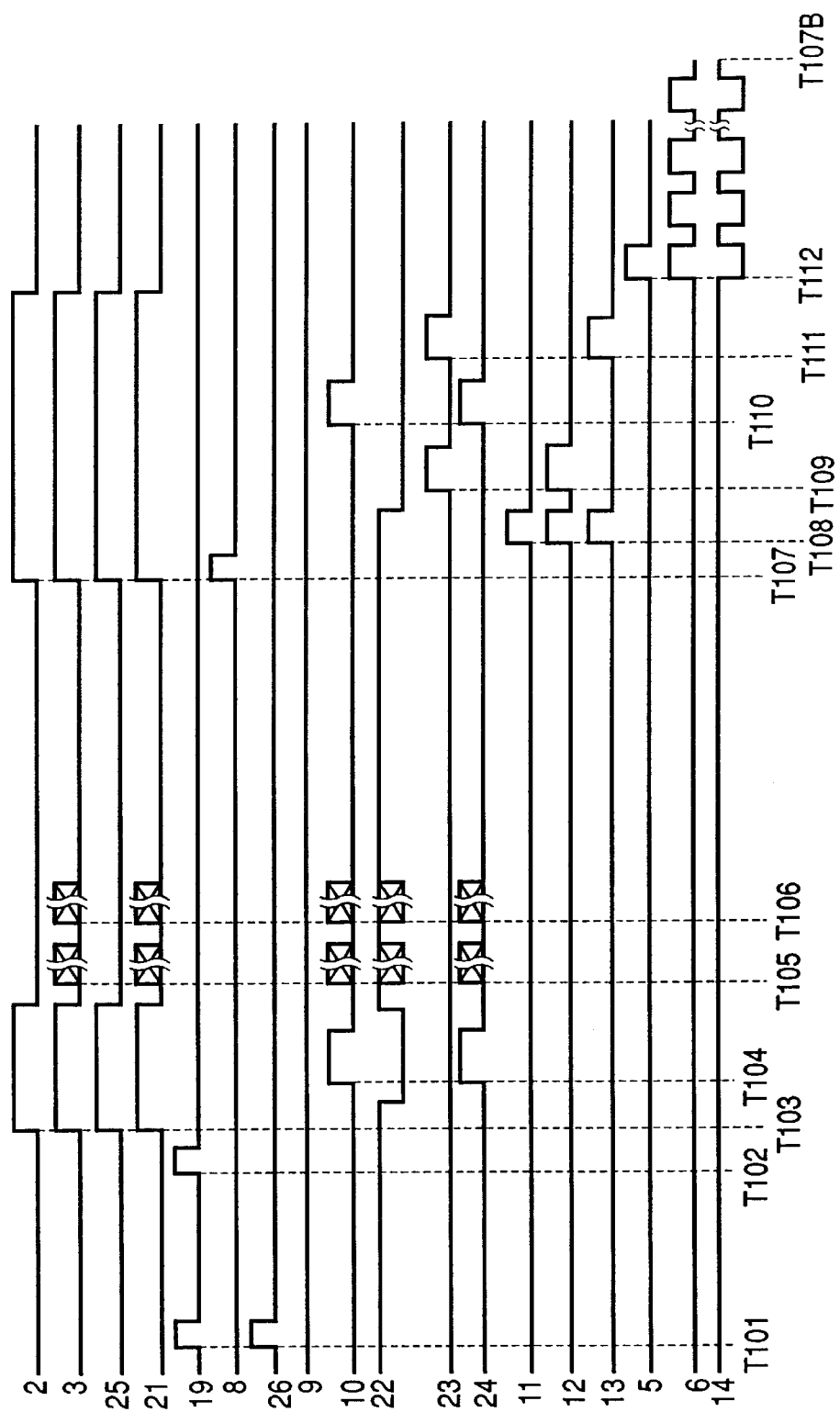
FIG. 8 is a block diagram showing the arrangement of the solid-state image pickup element according to the first embodiment of the present invention.

FIG. 8 is a timing chart showing the operation timings of the solid-state image pickup element shown in FIG. 7. The operation of the solid-state image pickup element shown in FIG. 7 will be described with reference to FIGS. 7 and 8.

At time T101, pulses of high level are applied to terminals 19 and 26 to reset the floating diffusion regions 102 of all pixels and reset the photodiodes 101 of all pixels. When resetting is ended, storage of charges corresponding to incident light by the photodiodes 101 of all pixels is started. At time T102, a pulse of high level is applied to the terminal 19 again to transfer charges stored in the photodiodes 101 of all pixels to the floating diffusion regions 102. At time T103, a vertical scanning start pulse is input to terminals 2 and 25, and a vertical scanning pulse is input to terminals 3 and 21 to select the first line, and signals 20a and 26a go high (not shown). At time T104, pulses of high level are applied to terminals 10 and 24 to transfer the voltage held in the floating diffusion region 102 to the diffusion floating capacitance 144 in the first line. From time T105, signals 20b and 26b go high, and the voltage is transferred from the floating diffusion region 102 to the diffusion region 144 in the second line. From time T106, signals 20c and 26c go high, and the voltage is transferred from the floating diffusion region 102 to the diffusion region 144 in the third line.

When this transfer is ended, voltage transfer from the floating diffusion regions 102 to the diffusion floating capacitances 144 in all pixels. This transfer does not require transfer in the horizontal direction, that is performed to output signals from terminals 16 and 17, and therefore is executed in a short time.

At time T107, a vertical scanning start pulse is input to the terminals 2 and 25, and a vertical scanning pulse is input to the terminals 3 and 21 to select the first line, and the signals 20a and 26a go high (not shown). Simultaneously, a pulse of high level is applied to the terminal 8 to reset the floating diffusion regions 102 of the first line. At time T108, pulses of high level are applied to terminals 11, 12, and 13 to reset the first capacitor 108B and second capacitor 109B. At time T109, pulses of high level are applied to the terminals 12 and 23 to read out the voltage in the floating diffusion region 144, i.e., a sum voltage of the signal voltage and reset voltage, to the first capacitor 108B. At time T110, pulses of high level are applied to the terminals 10 and 24 to transfer the voltage of the floating diffusion region 102 to the floating diffusion region 144. The voltage in the floating diffusion region 102 at this time corresponds to the reset voltage rarely containing smearing because not so long time has elapsed from resetting. At time T111, pulses of high level are applied to the terminals 13 and 23 to read out the voltage in the floating diffusion region 144, i.e., the reset voltage to the second capacitor 109B. At time T112, the voltage at the terminal 14 changes from high level to low level to reset the horizontal output lines 119 and 120. At the same time, a horizontal scanning start pulse is input to a terminal 5, and a horizontal scanning pulse is input to a terminal 6 to start the signal read from line memories formed from the capacitors of the respective columns. The input signal to a terminal 14 is in an opposite phase to that of the horizontal scanning pulse to prevent interference between the capacitors of the respective columns. Sums of signal voltages and reset voltages of the respective columns are sequentially output from the terminal 16. The reset voltages of the respective columns are sequentially output from the terminal 17. When the difference between two outputs is calculated by a subtracting means 126 connected to the output side, a signal voltage containing no reset voltage that varies between pixels can be obtained. Hence, an output with a high S/N ratio, which contains no noise component due to a variation in reset voltage, can be obtained.

From time T107B, the signals 20b and 26b and signals 20c and 26c sequentially go high. By the operation of the gate groups 123 and 143, the operation from time T107 to time T107B, which is performed for the first line, is continuously performed for the second and third lines.

The same time as that for the normal frame read is required from the start of output of signals of the first line from the terminals 16 and 17 to the end of output of signals of the third lines from the terminals 16 and 17. However, since no light leaks to the floating diffusion region 144, and the floating diffusion region 144 is formed in a well different from that of the photodiode 101, the voltage in the floating diffusion region 144 is held without any variation. Hence, a signal containing no smearing is output from the terminal 16.

The reset voltages of pixels of each line are also transferred to the floating diffusion region 144 and read out in the horizontal direction immediately after the floating diffusion regions 102 are reset in units of lines. Hence, a signal containing no smearing is output from the terminal 17.

The output signal from the terminal 16 and the output signal from the terminal 17 are input to a differential circuit (not shown). Hence, an image output signal that has no reset voltage varying between pixels and contains no smearing can be obtained from the output terminal of the differential circuit.

The signal in the floating diffusion region 144 can be read out not only in units of lines using the line memories of this embodiment but also in units of two-dimensional blocks of, e.g., 2×2 pixels.

The arrangement of the solid-state image pickup element according to the second embodiment is the same as that of the solid-state image pickup element of the first embodiment shown in FIG. 7. The second embodiment is different from the first embodiment in the application purpose and operation timings.

Figure 10:
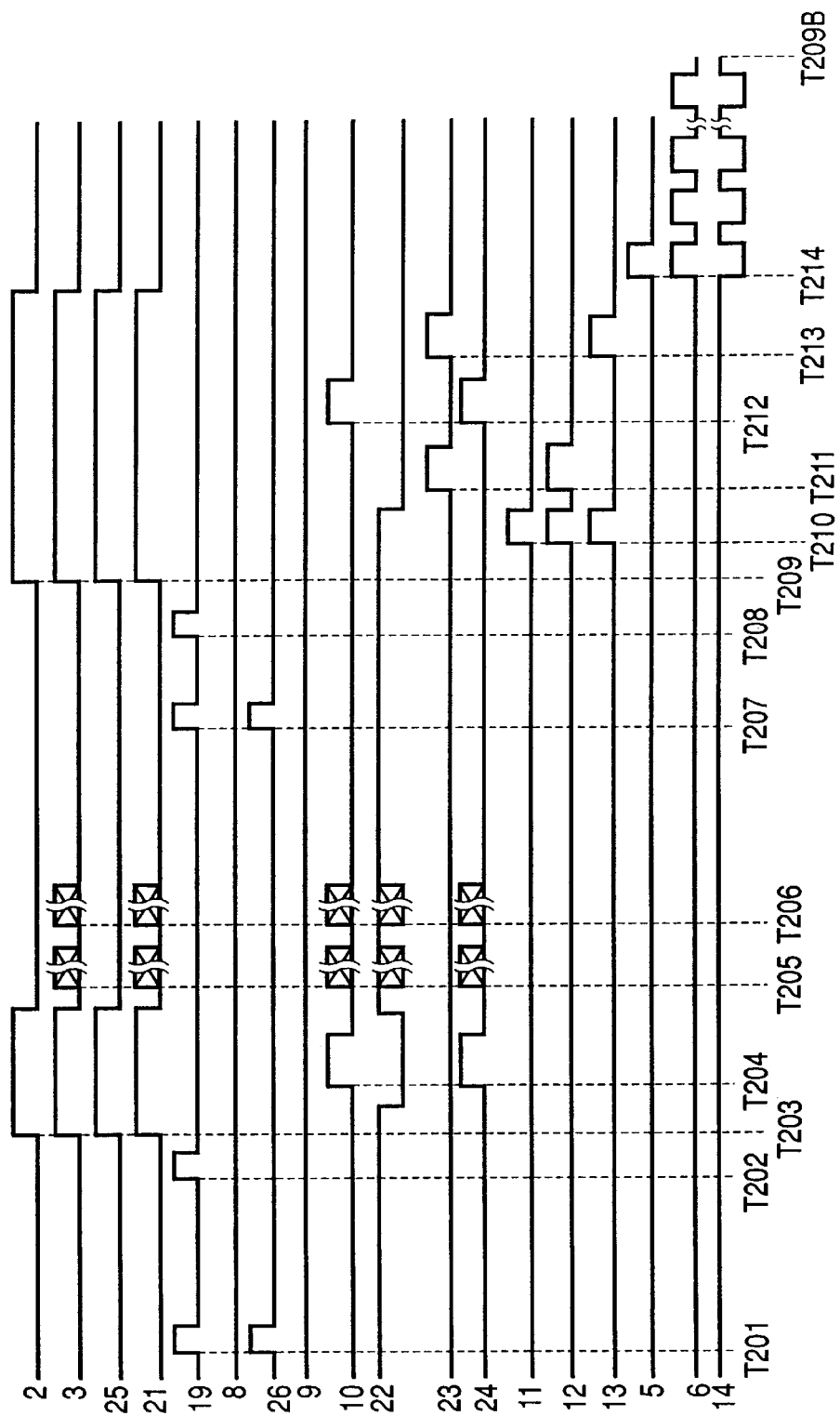
FIG. 10 is a timing chart showing the operation timings of a solid-state image pickup element according to the second embodiment of the present invention.

FIG. 10 is a timing chart showing the operation timings of the solid-state image pickup element of the second embodiment. The operation from time T201 to time T206 in this embodiment is the same as the operation from time T101 to time T106 in the first embodiment, and a detailed description thereof will be omitted. An object to be picked up during the period between time T201 and time T202 will be referred to as a first object.

The image pickup element picks up the second object during the period between time T207 and time T208. More specifically, at time T207, pulses of high level are applied to terminals 19 and 26 to reset a floating diffusion region 102 and a photodiode 101. At time T208, a pulse of high level is applied to the terminal 19 to transfer a signal corresponding to an image picked up during the period from time T207 to time T208 to the floating diffusion region 102.

Next, at time T209, a vertical scanning start pulse is input to terminals 2 and 25, and a vertical scanning pulse is input to terminals 3 and 21 to select the first line. Signals 20a and 26a go high (not shown). At time T210, pulses of high level are applied to terminals 11, 12, and 13 to reset a first capacitor 108B and a second capacitor 109B. At time T211, pulses of high level are applied to the terminals 12 and 23 to read out the voltage in a floating diffusion region 144, i.e., the sum voltage of the signal voltage corresponding to the first object and the reset voltage to the first capacitor 108B. At time T212, pulses of high level are applied to terminals 10 and 24 to transfer the voltage in the floating diffusion region 102 to the floating diffusion region 144. The voltage in the floating diffusion region 102 at this time corresponds to the sum voltage of the signal voltage corresponding to the second object and the reset voltage, which rarely contains smearing because not so long time has elapsed from resetting. At time T213, pulses of high level are applied to the terminals 13 and 23 to read out the voltage in the floating diffusion region 144, i.e., the sum voltage of the signal voltage corresponding to the second object, which rarely contains smearing, and the reset voltage to the second capacitor 109B. At time T214, the voltage at a terminal 14 changes from high level to low level to reset horizontal output lines 119 and 120. Simultaneously, a horizontal scanning start pulse is input to a terminal 5, and a horizontal scanning pulse is input to a terminal 6 to start the signal read from line memories formed from the capacitors of the respective columns. The input signal to the terminal 14 is in an opposite phase to that of the horizontal scanning pulse to prevent interference between the capacitors of the respective columns. Sums of signal voltages corresponding to the first object and reset voltages of the respective columns are sequentially output from a terminal 16. Sums of signal voltages corresponding to the second object and reset voltages of the respective columns are sequentially output from a terminal 17. When the difference between two outputs is calculated by a subtracting means 126 connected to the output side, a signal voltage obtained by subtracting the signal voltage corresponding to the second object from the signal voltage corresponding to the first object can be obtained. When the polarity of the subtracting means 126 is inverted, a signal voltage obtained by subtracting the signal voltage corresponding to the first object from the signal voltage corresponding to the second object can be obtained. Hence, an output with a high S/N ratio, which contains no noise component due to a variation in reset voltage, can be obtained. From time T209B, signals 20b and 26b and signals 20c and 26c sequentially go high. By the operation of the gate groups 123 and 143, the operation from time T209 to time T209B, which is performed for the first line, is continuously performed for the second and third lines.

When an image pickup apparatus with the solid-state image pickup element of this embodiment, which has an electronic flash, photographs the first object using electronic flash light, and the signal of the second object is subtracted from the signal of the first object by the subtracting means 126, an image signal corresponding to a signal obtained by subtracting the brightness of an object photographed using the external light from the brightness of an object photographed using electronic flash light can be obtained. In this image signal, the variation in reset voltage is canceled, so no noise due to the variation in reset voltage is contained.

When an image pickup apparatus with the solid-state image pickup element of this embodiment, which has an electronic flash, photographs the second object using electronic flash light, and the signal of the first object is subtracted from the signal of the second object by the subtracting means 126, an image signal corresponding to a signal obtained by subtracting the brightness of an object photographed using the external light from the brightness of an object photographed using electronic flash light can be obtained. In this image signal, the variation in reset voltage is canceled, so no noise due to the variation in reset voltage is contained.

The third embodiment is associated with various arrangements of pixels of a solid-state image pickup element. FIGS. 11A to 11E are equivalent circuit diagrams showing the arrangements of a pixel according to the third embodiment.

The pixel shown in FIG. 11A is the same as in the first and second embodiments. The photodiode and all transistors of this pixel are formed from NMOS transistors.

In the pixel shown in FIG. 11B, a transistor 106 is replaced with a transistor 105b. This pixel operates like the pixel shown in FIG. 11A.

In the pixel shown in FIG. 11C, a transistor 103 is omitted. In this pixel, the floating diffusion region as a memory is not formed.

The photodiode and all transistors of the pixel shown in FIG. 11D are formed from PMOS transistor. This pixel can be regarded as the pixel shown in FIG. 11A with the inverted polarity.

In the pixel shown in FIG. 11E, the photodiode of the pixel shown in FIG. 11A is replaced with a photogate. The storage/read of photocarriers (charges) in/from the photogate is controlled by a gate voltage.

As described above, according to the above embodiments, an image signal corresponding to light received by all pixels in the same time period is formed. For this reason, even when the object moves at a high speed, the contents at the upper portion of the image do not shift from the contents at the lower portion of the screen.

According to the above embodiments, an image signal corresponding to light received by all pixels in the same time period is formed. For this reason, even in photographing using electronic flash light, the brightness at the upper portion of the screen can be prevented from being different from that at the lower portion of the screen.

According to the above embodiments, charges transferred from the photodiode to the floating diffusion region adjacent to the photodiode are transferred to the memory at high speed before an image signal is output. For this reason, a signal without any smearing due to a variation in charges in the floating diffusion region after reception of charges transferred from the photodiode can be output.

According to the above embodiments, an image signal corresponding to a signal obtained by subtracting the image signal of an image illuminated with only external light from the image signal of the object illuminated with not only the external light but also electronic flash light can be obtained. Hence, the image signal of the object receiving only the electronic flash light can be obtained.

According to the above embodiments, both the signal containing the signal voltage and reset voltage obtained upon receiving light and the signal corresponding to only the reset voltage are read out through the memory constructed by the transfer transistor 140, buffer 141, and floating diffusion region 144. Eventually, not only noise in the pixel but also noise generated by, e.g., a variation between the memories can be corrected.

In the above-described first and second embodiments, the output signal of the pixel is supplied to the buffer in the memory cell through the transistor 140. However, a clamp circuit or a level shift circuit may be disposed between the pixel and the buffer to adjust an output voltage range of the pixel to an input dynamic range of the buffer 141.

The fourth embodiment in which the solid-state image pickup element of the present invention is applied to a video camera will be described with reference to FIG. 12.

Figure 12:
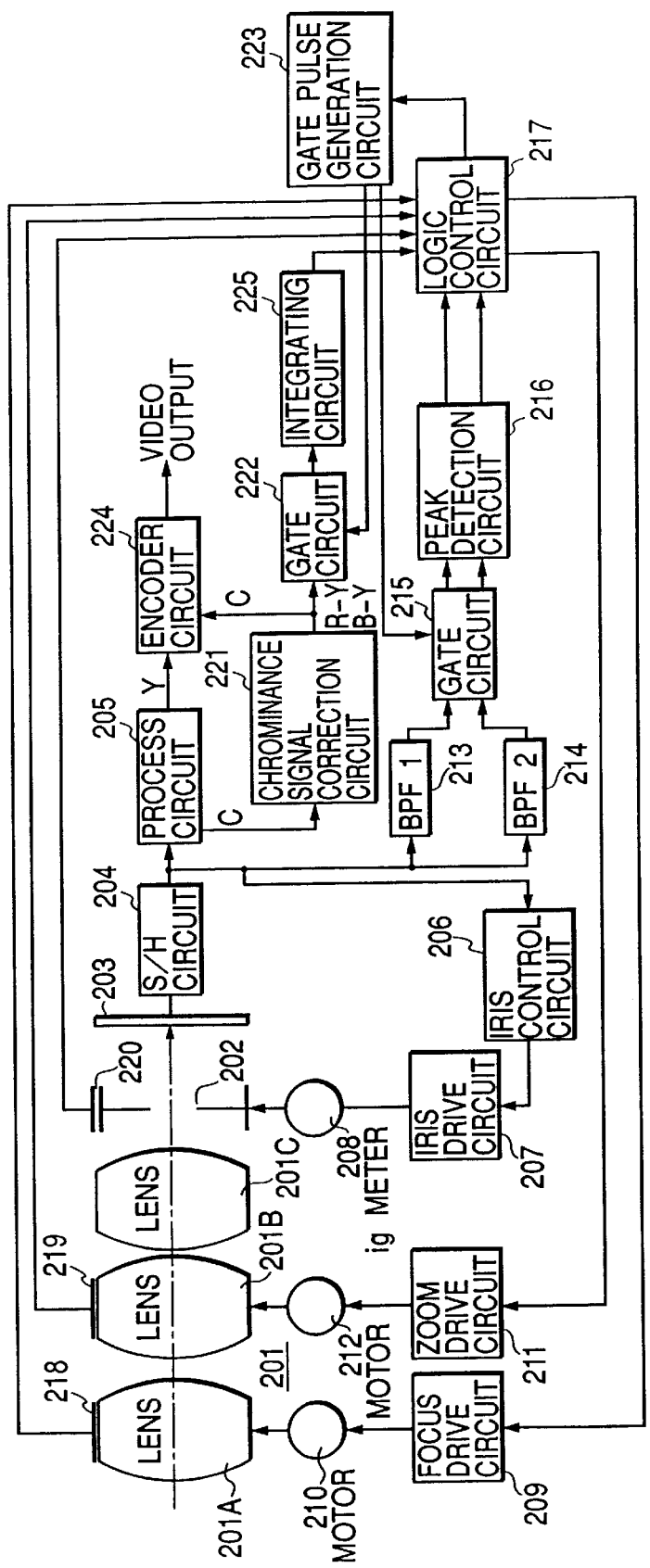
FIG. 12 is a block diagram of a video camera using the solid-state image pickup element of the present invention.

FIG. 12 is a block diagram showing a case wherein the solid-state image pickup element of the present invention is applied to a video camera. A photographing lens 201 comprises a focus lens 201A for adjusting focusing, a zoom lens 201B for zooming, and an imaging lens 201C.

The video camera has an iris 202, a solid-state image pickup element 203 for photoelectrically converting an object image formed on the image pickup surface into an electrical image pickup signal, and a sample/hold circuit (S/H circuit) 204 for sampling/holding the image pickup signal output from the solid-state image pickup element 203 and amplifying the level of the signal. The sample/hold circuit 204 outputs a video signal.

A process circuit 205 performs predetermined processing such as gamma correction, color separation, and blanking processing for the video signal output from the sample/hold circuit 204 and outputs a luminance signal Y and chrominance signals C.

The chrominance signals C output from the process circuit 205 are subjected to white balance and color balance correction by a chrominance signal correction circuit 221 and output as color difference signals R-Y and B-Y.

The luminance signal Y output from the process circuit 205 and the color difference signals R-Y and B-Y output from the chrominance signal correction circuit 221 are modulated by an encoder circuit (ENC circuit) 224 and output as a standard television signal. The signal is supplied to a video recorder or monitor EVF such as an electronic viewfinder (none are shown).

An iris control circuit 206 controls an iris drive circuit 207 on the basis of the video signal supplied from the sample/hold circuit 204 and automatically controls an ig meter 208 to control the aperture amount of the iris 202 such that the video signal has a predetermined level.

Bandpass filters (BPF) 213 and 214 with different band limits extract high-frequency components necessary for in-focus detection from the video signal output from the sample/hold circuit 204. Signals output from the first bandpass filter (BPF1) 213 and second bandpass filter (BPF2) 214 are gated through a gate circuit 215 in accordance with a focus gate frame signal. The peak values of the signals are held and detected by a peak detection circuit 216, and then, the signals are input to a logic control circuit 217. These signals are called focus voltages, and focusing is done in accordance with the focus voltages.

A focus encoder 218 detects the moving position of the focus lens 201A. A zoom encoder 219 detects the focal length of the zoom lens 201B. An iris encoder 220 detects the aperture amount of the iris 202. The detection values of these encoders are supplied to the logic control circuit 217 for performing system control.

The logic control circuit 217 detects the in-focus state of an object and adjusts focusing on the basis of a video signal corresponding to a set in-focus detection region. More specifically, the logic control circuit 217 receives the peak value information of high-frequency components supplied from the bandpass filters 213 and 214, supplies control signals for controlling the rotational direction, rotational speed, and rotation/stop of a focus motor 210 to a focus drive circuit 209, and controls the focus motor 210 to drive the focus lens 201A to a position where the peak values of the high-frequency components are maximized.

The fifth embodiment in which the solid-state image pickup element of the present invention is applied to a still camera will be described with reference to FIG. 13.

Figure 13:
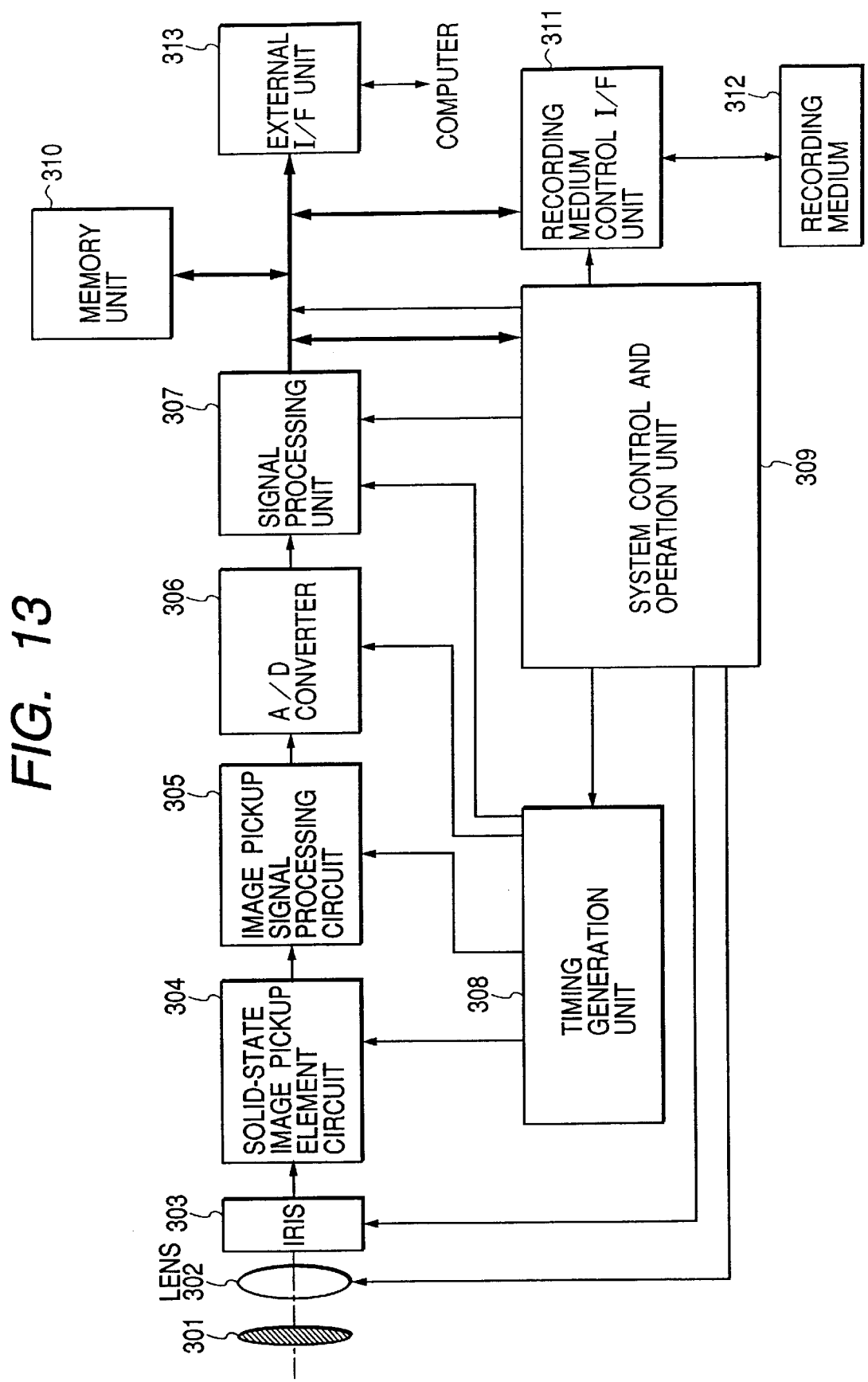
FIG. 13 is a block diagram of a still camera using the solid-state image pickup element of the present invention.

FIG. 13 is a block diagram showing a case wherein the solid-state image pickup element of the present invention is applied to a "still video camera".

Referring to FIG. 13, a barrier 301 serves as a lens protector and a main switch. A lens 302 forms an optical image of an object on a solid-state image pickup element 304. An iris 303 changes the amount of light passing through the lens 302. The solid-state image pickup element 304 receives the object image formed by the lens 302 as an image signal. An A/D converter 306 analog/digital-converts the image signal output from the solid-state image pickup element 304. A signal processing unit 307 performs various correction operations for the image data output from the A/D converter 306 and compresses the data. A timing generation unit 308 outputs various timing signals to the solid-state image pickup element 304, an image pickup signal processing circuit 305, the A/D converter 306, and the signal processing unit 307. A system control and operation unit 309 performs various calculations and controls the entire still video camera. A memory unit 310 temporarily stores image data. An interface unit 311 is used to record/read data in/from a recording medium. A detachable recording medium 312 such as a semiconductor memory is used to record or read image data. An interface unit 313 is used to communicate with an external computer or the like.

The operation of the still video camera with the above-described arrangement in photographing will be described next.

When the barrier 301 is opened, the main power supply is turned on. Next, the power supply of the control system is turned on. In addition, the power supply of the image pickup system circuit including the A/D converter 306 is turned on.

To control the exposure amount, the system control and operation unit 309 opens the iris 303. A signal output from the solid-state image pickup element 304 is converted by the A/D converter 306 and input to the signal processing unit 307. On the basis of the data, exposure calculation is performed by the system control and operation unit 309.

The brightness is determined on the basis of the photometry result. In accordance with the determination result, the system control and operation unit 309 controls the iris.

A high-frequency component is extracted from the signal output from the solid-state image pickup element 304. The system control and operation unit 309 calculates the distance from the object. After this, the lens is driven to determine the in-focus state. If it is determined that no in-focus state is set, the lens is driven again to measure the distance.

After the in-focus state is confirmed, exposure is started. When exposure is ended, the image signal output from the solid-state image pickup element 304 is A/D-converted by the A/D converter 306, passes through the signal processing unit 307, and is written in the memory unit by the system control and operation unit 309. The data stored in the memory unit 310 is recorded in the detachable recording medium 312 such as a semiconductor memory through the recording medium control I/F unit under the control by the system control and operation unit 309. The image data may be directly input to a computer through the external interface unit 313 and processed.

May widely different embodiments of the present invention may be constructed without departing form the spirit

What is claimed is:

1. An image pickup apparatus comprising:

a plurality of pixels arranged two-dimensionally, each of said plurality of pixels including a photoelectric conversion portion, a first holding portion which holds a signal from said photoelectric conversion portion, and a read-out portion which reads out a signal from said first holding portion;

a drive circuit which has: (1) a first mode for simultaneously transferring photoelectric conversion signals, obtained in the photoelectric conversion portions included in the respective pixels arranged two-dimensionally, to the first holding portions corresponding to the respective photoelectric conversion portions of the pixels, and thereafter reading out continuously, via respective said read-out portions, the signals held in the first holding portions included in the respective pixels arranged two-dimensionally, wherein the signals held in the first holding portion comprise a photoelectric conversion signal and a noise signal; and (2) a second mode for reading out continuously, via respective said read-out portions, noise signals from said plurality of pixels arranged two-dimensionally, without reading out the photoelectric conversion signals from said plurality of pixels arranged two-dimensionally; and a correction circuit which corrects a first signal which includes the photoelectric conversion signal read out in the first mode, using a second signal which includes the noise signal read out in the second mode.

2. An apparatus according to claim 1, further comprising:

a plurality of second holding portions which hold signals from said plurality of pixels;

a first line which includes a plurality of said pixels, said first line being arranged in a predetermined direction; and a second line which includes a plurality of said pixels, said second line being arranged in the predetermined direction but including pixels different from those included in said first line, wherein said drive circuit effects control so that:

(1) the first signals from the plurality of pixels included in said first line are transferred to said plurality of second holding portions, then (2) the second signals from the plurality of pixels included in said first line are transferred to said plurality of second holding portions, then (3) said correction circuit corrects the first signals from the second holding portions using the second signals from the second holding portions, then (4) the first signals from the plurality of pixels included in said second line are transferred to said plurality of second holding portions, then (5) the second signals from the plurality of pixels included in said second line are transferred to said plurality of second holding portions, and then (6) said correction circuit corrects the first signals from the second holding portions using the second signals from the second holding portions.

3. An apparatus according to claim 1, further comprising:

a plurality of second holding portions which hold signals from said plurality of pixels;

a first line which includes a plurality of said pixels, said first line being arranged in a predetermined direction; and a second line which includes a plurality of said pixels, said second line being arranged in the predetermined direction but including pixels different from those included in said first line, wherein said drive circuit effects control so that:

(1) the first signals from the plurality of pixels included in said first and second lines are transferred to said plurality of second holding portions, then (2) the first signals from the plurality of pixels included in said first line are read out from said plurality of second holding portions, then (3) the second signals from the plurality of pixels included in said first line are read out from those pixels, then (4) said correction circuit corrects the read-out first signals from the plurality of pixels included in said first line, using the read-out second signals from the plurality of pixels included in said first line, then (5) the first signals from the plurality of pixels included in said second line are read out from said plurality of second holding portions, then (6) the second signals from the plurality of pixels included in said second line are read out from those pixels, and then (7) said correction circuit corrects the read-out first signals from the plurality of pixels included in said second line using the read-out second signals from the plurality of pixels included in said second line.

4. An apparatus according to claim 3, wherein the first and second signals from the plurality of pixels included in each of said first and second lines are read out in parallel to be inputted in parallel into said plurality of second holding portion.

5. An apparatus according to claim 1, further comprising:

a lens which focuses light onto the plurality of pixels;

a signal processing circuit which processes a signal from said correction circuit; and a connection unit which connects said apparatus to an external apparatus.

* * * * *

UNITED STATES PATENT AND TRADEMARK OFFICE
CERTIFICATE OF CORRECTION

PATENT NO. : 6,831,685 B1
DATED : December 14, 2004
INVENTOR(S) : Isamu Ueno et al.

It is certified that error appears in the above-identified patent and that said Letters Patent is hereby corrected as shown below:

Title page,
Item [56], References Cited, U.S. PATENT DOCUMENTS, please add:
-- 4,835,404   05/30/89   S. Sugawa et al.    250/578;
   4,879,470   11/07/89   S. Sugawa et al.    250/578;
   4,967,067   10/30/90   S. Hashimoto et al. 250/208.1;
   4,972,243   11/20/90   S. Sugawa et al.    357/30;
   5,162,912   11/10/92   I. Ueno et al.      358/213.16;
   5,184,006   02/02/93   I. Ueno             250/208.1;
   RE 34,309   07/13/93   N. Tanaka et al.    358/213.31;
   5,262,870   11/16/93   K. Nakamura et al.  358/212;
   5,539,196   07/23/96   M. Miyawaki et al.  250/208.1; and
   5,714,752   02/03/98   I. Ueno et al.      250/208.1 --.

Column 1,
Line 46, "2,: a" should read -- 2, a --.

Column 3,
Line 16, "time" (first occurrence) should read -- the --.

Column 7,
Line 34, "transfer" (second occurrence) should read -- transfers --.

Column 12,
Line 65, "May" should read -- Many --; and
Line 66, "form" should read -- from --.

UNITED STATES PATENT AND TRADEMARK OFFICE
CERTIFICATE OF CORRECTION

PATENT NO. : 6,831,685 B1
DATED : December 14, 2004
INVENTOR(S) : Isamu Ueno et al.

It is certified that error appears in the above-identified patent and that said Letters Patent is hereby corrected as shown below:

Column 14,
Line 47, "portion." should read -- portions. --.

Signed and Sealed this

Twenty-eighth Day of June, 2005

JON W. DUDAS
*Director of the United States Patent and Trademark Office*